United States Patent [19]

Mayer et al.

[11] Patent Number: 4,477,381
[45] Date of Patent: Oct. 16, 1984

[54] TRIAMINOTRIARYLMETHANE COLORANTS

[75] Inventors: Udo Mayer, Frankenthal; Erwin Hahn, Heidelberg; Joachim Jesse, Schwetzingen, all of Fed. Rep. of Germany

[73] Assignee: BASF Aktiengesellschaft, Ludwigshafen, Fed. Rep. of Germany

[21] Appl. No.: 350,358

[22] Filed: Feb. 19, 1982

[30] Foreign Application Priority Data

Mar. 7, 1981 [DE] Fed. Rep. of Germany ....... 3108720

[51] Int. Cl.³ .............................. C09B 11/10
[52] U.S. Cl. ..................... 260/392; 260/387
[58] Field of Search ................ 260/387, 392

[56] References Cited

U.S. PATENT DOCUMENTS

| | | | |
|---|---|---|---|
| 252,203 | 1/1882 | Fischer | 260/392 |
| 3,184,483 | 5/1965 | Quint et al. | 260/387 |
| 3,211,757 | 10/1965 | Schäfer et al. | 260/387 |
| 3,652,602 | 3/1972 | Schafer et al. | 260/392 |
| 3,671,553 | 6/1972 | Papenfuss et al. | 260/392 |

FOREIGN PATENT DOCUMENTS

| | | | |
|---|---|---|---|
| 1036242 | 8/1958 | Fed. Rep. of Germany | 260/387 |
| 1046599 | 12/1958 | Fed. Rep. of Germany | 260/387 |
| 1098652 | 2/1961 | Fed. Rep. of Germany | 260/392 |
| 1644619 | 9/1971 | Fed. Rep. of Germany | 260/392 |
| 2545649 | 4/1977 | Fed. Rep. of Germany | 260/392 |

OTHER PUBLICATIONS

Abrahart, *Dyes and Their Intermediates,* 1968, pp. 220–221, Pergamon Press, N.Y., N.Y.

*Primary Examiner*—Richard Raymond
*Assistant Examiner*—Raymond Covington
*Attorney, Agent, or Firm*—Oblon, Fisher, Spivak, McClelland & Maier

[57] ABSTRACT

Triaminotriarylmethane colorants are obtainable by first reacting an aluminum or iron trihalide complex of a 4,4′,4″-trihalotriphenylmethyl halide with a metanilic acid, a sulfanilic acid or a β-naphthylaminesulfonic acid and then reacting the product with one or more anilines to replace the halogen atoms located in the 4-positions.

The compounds according to the invention are very useful as pigments, for example in printing inks, or for toning carbon black.

5 Claims, No Drawings

TRIAMINOTRIARYLMETHANE COLORANTS

The present invention relates to triaminotriarylmethane colorants obtainable by first reacting an aluminum or iron trihalide complex of a 4,4′,4″-trihalotriphenylmethyl halide with a metanilic acid, a sulfanilic acid or a β-naphthylaminesulfonic acid and then reacting the product with one or more anilines to replace the halogen atoms located in the 4-position.

The aluminum chloride complex of 4,4′,4″-trichlorotriphenylmethyl halide is a particularly suitable starting compound, and its preparation is described, for example, in German Published Application DAS No. 1,036,242 and DAS No. 1,046,599.

2-Napthylamine-4-sulfonic acid, 2-naphthylamine-5-sulfonic acid, 2-naphthylamine-6-sulfonic acid, 2-naphthylamine-7-sulfonic acid and 2-naphthylamine-8-sulfonic acid are examples of β-naphthylaminesulfonic acids which are suitable for the reaction.

Unsubstituted metanilic acid and sulfanilic acid are preferred for the first reaction.

The anilines which are required for the second stage of the replacement can, for example, be substituted by fluorine, chlorine, bromine, $C_1$–$C_4$-alkyl, $C_1$–$C_4$-alkoxy or $C_1$–$C_4$-acylamino; aniline and the chlorine-substituted, methoxy-substituted and, in particular, methyl-substituted derivatives are preferred.

The reactants are used in molar amounts which depend on the desired degree of sulfonation of the end product, but pigment properties are obtained only when an upper limit of one sulfonic acid group per molecule is observed. Lower degrees of sulfonation can be obtained as desired by reacting the appropriate amount of sulfonic acid.

In the reaction with the anilines, it is necessary to ensure that the aniline is present in an amount sufficient not only for replacement of halogen atoms but also for binding the hydrogen halide liberated. As a rule, an adequate amount of aniline is from 2.5 to 7 moles, based on the metal complex.

The replacement of halogen is advantageously carried out in solvents such as chlorobenzene or dichlorobenzene, and conventionally at from 120° to 180° C., preferably from 130° to 160° C.

The reaction times are usually from 1 to 20 hours, depending on the temperature and the aniline used.

Experimental details of the reaction are to be found in the Examples, in which parts and percentages are by weight unless stated otherwise.

The novel compounds range from violet to blue and, when finished appropriately, are useful as pigments, for example for the preparation of printing inks and for toning carbon black.

Similar pigments which have been prepared in a different manner have been disclosed, for example in German Published Application DAS No. 1,098,652, and German Laid-Open Applications DOS No. 1,644,619 and DOS No. 2,545,649. In the known processes, the compounds which do not contain sulfonic acid groups are prepared first, and these must then be converted into the pigments carrying a sulfonic acid group by sulfonation.

Owing to the absence of the sulfonation step, the preparation of the novel products is more economical and causes less pollution than the above processes.

EXAMPLE 1

A mixture consisting of 44 parts of sulfanilic acid, 140 parts of 4,4′,4″-trichlorotriphenylmethyl aluminum tetrachloride and 140 parts of chlorobenzene is refluxed until hydrogen chloride gas is no longer evolved (about 3 hours). 134 parts of p-toluidine are then added, and the mixture is refluxed for a further 2 hours. The mixture is cooled to 90° C. and 200 parts of ethanol and 350 parts of a 20% strength sodium hydroxide solution are allowed to run in, 2 phases being formed. The lower aqueous phase is separated off, and the organic phase is freed from the solvents and the excess p-toluidine by distillation under reduced pressure. The distillation residue is taken up in 1,500 parts of a 5% strength sodium hydroxide solution and 25% strength sulfuric acid is added. The colorant crystallizes out at a pH of 5-6. The pH is then decreased to 1.5, and the colorant is filtered off under suction and dried at 70° C. 135 parts of the colorant are obtained. The colorant can be processed to give greenish-blue printing inks.

EXAMPLE 2

If the procedure of Example 1 is followed and, instead of the sulfanilic acid, the same weight of metanilic acid is used, 129 parts of a greenish-blue colorant are obtained.

EXAMPLE 3

Further blue colorants, which have been prepared as described in Examples 1 and 2 by replacing the p-toluidine, are described in the Table:

| Example | Sulfonic acid | Aniline derivative | Yield (parts) |
| --- | --- | --- | --- |
| 3 | sulfanilic acid | m-toluidine | 136 |
| 4 | metanilic acid | m-toluidine | 142 |
| 5 | sulfanilic acid | p-anisidine | 139 |
| 6 | metanilic acid | p-anisidine | 129 |
| 7 | sulfanilic acid | p-chloroaniline | 115 |
| 8 | sulfanilic acid | m-chloroaniline | 121 |

EXAMPLE 9

A mixture of 30 parts of sulfanilic acid, 140 parts of 4,4′,4″-trichlorotriphenylmethyl aluminum tetrachloride and 140 parts of chlorobenzene is refluxed for about 3 hours, as in Example 1. Thereafter, 116 parts of aniline are added and the mixture is refluxed for a further 14 hours. 120 parts of isopropanol and 350 parts of a 20% strength sodium hydroxide solution are added at 90° C., and the lower aqueous phase is then separated off. The organic phase is taken up in 1,000 parts of water. The pH is brought to 7 with 25% strength sulfuric acid, and the solvent is removed by steam distillation, during which the colorant begins to crystallize. The pH is finally brought to 1, and the colorant is filtered off under suction at 60° C. and dried at 70° C. 125 parts of a neutral blue colorant are obtained, which is useful in printing inks, particularly for toning carbon black.

EXAMPLE 10

A mixture of 44 parts of sulfanilic acid, 140 parts of 4,4′,4″-trichlorotriphenylmethyl aluminum tetrachloride and 250 parts of o-dichlorobenzene is kept at 170° C. for 1 hour. Thereafter, 140 parts of aniline are added and the mixture is kept at 170° C. for a further 3 hours.

The mixture is worked up as described in Example 1 to give 119 parts of a reddish-blue colorant which is useful in printing inks.

EXAMPLE 11

If the procedure of Example 1 is followed and o-toluidine is used instead of p-toluidine, a reddish-blue colorant is also obtained.

EXAMPLE 12

A mixture of 15.6 parts of sulfanilic acid, 56.6 parts of 4,4',4''-trichlorotriphenylmethyl aluminum tetrachloride and 60 parts of chlorobenzene is refluxed for 3 hours. 12.8 parts of m-toluidine are first added at this temperature, and 27.9 parts of aniline are then added after a further 2 hours. 10 hours after the addition of the aniline, the mixture is cooled and worked up as described in Example 1 to give 50 parts of a blue colorant which is useful in printing inks.

Colorants with similar properties are obtained when the procedure of Example 12 is followed and instead of m-toluidine an equimolar amount of p-toluidine, p-anisidine or p-chloroaniline is used.

EXAMPLE 13

30 parts of sulfanilic acid and 116 parts of aniline are reacted with 140 parts of 4,4',4''-trichlorotriphenylmethyl aluminum tetrachloride, as described in Example 9. Heating is continued for 14 hours, and the hot reaction mixture is then introduced into 2,000 parts of water. The mixture is stirred for 30 minutes at 60° C. and thereafter the crystalline product is filtered off under suction, washed first with 1,000 parts of water and then with 400 parts of chlorobenzene, and dried. 118 parts of a neutral blue colorant are obtained which, after finishing appropriately, is useful for the preparation of printing inks.

We claim:

1. A mixed triaminotriarylmethane colorant having an upper limit of one sulfonic acid group per dye molecule obtainable by first reacting an aluminum or iron trihalide complex of a 4,4',4''-trihalotriphenylmethyl halide starting material with a sufficient amount of a metanilic acid, a sulfanilic acid or a β-naphthalaminesulfonic acid to give a first product having an upper limit of one sulfonic acid group per molecule and then reacting the product and any remaining starting material with a sufficient amount of one or more anilines to replace all the unreacted halogen atoms located in the 4-positions of said product and said remaining starting material.

2. A mixed colorant as claimed in claim 1, which is obtainable by reacting the aluminum complex.

3. A mixed colorant as claimed in claim 1, which is obtainable by reacting metanilic acid or sulfanilic acid.

4. A mixed colorant as claimed in claim 1, which has a degree of sulfonation of from 0.3 to 0.9.

5. A mixed colorant as claimed in claim 1, which is obtainable by carrying out the reaction in chlorobenzene or dichlorobenzene.

* * * * *